United States Patent
Grbic et al.

(10) Patent No.: US 9,292,917 B2
(45) Date of Patent: Mar. 22, 2016

(54) METHOD AND SYSTEM FOR MODEL-BASED FUSION OF COMPUTED TOMOGRAPHY AND NON-CONTRASTED C-ARM COMPUTED TOMOGRAPHY

(71) Applicants: Reinhard Boese, Wuerzburg (DE); Ursula Boese, Wuerzburg (DE); Antje Schulte, Eckental (DE)

(72) Inventors: Sasa Grbic, Princeton, NJ (US); Razvan Ioan Ionasec, Nuremberg (DE); Matthias John, Nuremberg (DE); Jan Boese; Christian Gesell, Kronach (DE); Dorin Comaniciu, Princeton Junction, NJ (US)

(73) Assignee: Siemens Aktiengesellschaft, Munich (DE)

(*) Notice: Subject to any disclaimer, the term of this patent is extended or adjusted under 35 U.S.C. 154(b) by 436 days.

(21) Appl. No.: 13/683,224

(22) Filed: Nov. 21, 2012

(65) Prior Publication Data
US 2013/0129174 A1    May 23, 2013

Related U.S. Application Data

(60) Provisional application No. 61/563,082, filed on Nov. 23, 2011.

(51) Int. Cl.
*G06K 9/00* (2006.01)
*G06T 7/00* (2006.01)

(52) U.S. Cl.
CPC ............. *G06T 7/0012* (2013.01); *G06T 7/0032* (2013.01); *G06T 2200/04* (2013.01); *G06T 2207/10081* (2013.01); *G06T 2207/10121* (2013.01); *G06T 2207/20081* (2013.01); *G06T 2207/20221* (2013.01); *G06T 2207/30048* (2013.01); *G06T 2207/30061* (2013.01); *G06T 2207/30101* (2013.01)

(58) Field of Classification Search
None
See application file for complete search history.

(56) References Cited

U.S. PATENT DOCUMENTS

| | | | |
|---|---|---|---|
| 7,010,080 B2 | 3/2006 | Mitshke | |
| 7,117,026 B2 | 10/2006 | Shao et al. | |
| 7,916,919 B2 | 3/2011 | Zheng et al. | |
| 2010/0067768 A1 | 3/2010 | Ionasec et al. | |
| 2011/0135173 A1 | 6/2011 | Elbaroudi et al. | |
| 2012/0022843 A1 | 1/2012 | Ionasec et al. | |
| 2012/0230568 A1 | 9/2012 | Grbic et al. | |
| 2012/0281900 A1* | 11/2012 | Rueckert et al. | 382/131 |

\* cited by examiner

*Primary Examiner* — Weiwen Yang (57) ABSTRACT

A method and system for model-based fusion of multi-modal volumetric images is disclosed. A first patient-specific model of an anchor anatomical structure is detected in a first medical image acquired using a first imaging modality, and a second patient-specific model of the anchor anatomical structure is detected in a second medical image acquired using a second imaging modality. A weighted mapping function is determined based on the first patient-specific model of the anchor anatomical structure and the second patient-specific model of the anchor anatomical structure using learned weights to minimize mapping error with respect to a target anatomical structure. The target anatomical structure from the first medical image to the second medical image using the weighted mapping function. In an application of this model-based fusion to transcatheter valve therapies, the trachea bifurcation is used as the anchor anatomical structure and the aortic valve is the target anatomical structure.

31 Claims, 5 Drawing Sheets

METHOD AND SYSTEM FOR MODEL-BASED FUSION OF COMPUTED TOMOGRAPHY AND NON-CONTRASTED C-ARM COMPUTED TOMOGRAPHY

This application claims the benefit of U.S. Provisional Application No. 61/563,082, filed Nov. 23, 2011, the disclosure of which is herein incorporated by reference.

BACKGROUND OF THE INVENTION

The present invention relates to fusion of multi-modal volumetric medical images, and more particularly, to model-based fusion of pre-operative computed tomography (CT) and intra-operative non-contrasted C-arm CT images.

In recent years, there has been a major trend in cardiac therapy towards minimally invasive procedures to reduce the risks involved with classical surgical techniques. Transcatheter valve interventions are becoming the standard therapy for high risk surgical patients. Such procedures off the potential to reduce morbidity, mortality, and costs of surgical valve replacement or repair, while accelerating patient recovery. One type of minimally invasive procedure is Transcatheter Aortic Valve Replacement (TAVI). The TAVI procedure involves accessing a femoral artery, performing balloon valvuloplasty, then advancing an artificial aortic valve across the native valve using a catheter. During rapid right ventricular pacing, a balloon is inflated to deploy the artificial valve. As there is no direct view of the affect anatomy, advanced imaging techniques such as 3D C-arm CT and real-time C-arm fluoroscopy are used for intra-operative guidance during such minimally invasive procedures. However, such intra-operative imaging modalities typically have limited image quality of soft tissue and reliable assessment of the cardiac anatomy typically must be achieved by injecting contrast agent, which can be harmful to patients and requires complex acquisition protocols.

BRIEF SUMMARY OF THE INVENTION

The present invention provides a method and system for fusion of pre-operative and intra-operative imaging modalities. Embodiments of the present invention map high-quality patient-specific models from a pre-operative imaging modality, such as computed tomography (CT), to an intra-operative imaging modality, such as 3D C-arm CT, without adding contrast agent. Embodiments of the present invention use a surrogate anatomy, such as the trachea bifurcation, that is visible in both modalities without adding contrast agent in order to determine an accurate mapping for an object of interest, such as the aortic valve, which does not have to be visible in both modalities. Embodiments of the present invention achieve robustness and efficiency by relying on machine learning techniques during a model estimation process in which patient-specific models of the surrogate anatomy are estimated. Embodiments of the present invention utilize a weighted mapping function with weights learned from ground truth annotations in training data to minimize mapping error with respect to the anatomy of interest.

In one embodiment of the present invention, a first patient-specific model of an anchor anatomical structure is detected in a first medical image acquired using a first imaging modality, and a second patient-specific model of the anchor anatomical structure is detected in a second medical image acquired using a second imaging modality. A weighted mapping function is determined based on the first patient-specific model of the anchor anatomical structure and the second patient-specific model of the anchor anatomical structure using learned weights to minimize mapping error with respect to a target anatomical structure. The target anatomical structure from the first medical image to the second medical image using the weighted mapping function.

These and other advantages of the invention will be apparent to those of ordinary skill in the art by reference to the following detailed description and the accompanying drawings.

DETAILED DESCRIPTION

The present invention relates to model-based fusion of multi-modal volumetric images. Embodiments of the present invention can be used to fuse image information in multiple imaging modalities, such as computed tomography (CT), Dyna CT, echocardiography data, fluoroscopic image data, and magnetic resonance imaging (MRI). Embodiments of the present invention are described herein to give a visual understanding of the model-based image fusion method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention provide a method and system for fusion of pre-operative and intra-operative imaging modalities, and thus map high-quality patient-specific models from a pre-operative imaging modality, such as computed tomography (CT), to an intra-operative imaging modality, such as 3D C-arm CT, without adding contrast agent. Embodiments of the present invention use a surrogate anatomy, such as the trachea bifurcation, that is visible in both modalities without adding contrast agent in order to determine an accurate mapping for an object of interest, such as the aortic valve, which does not have to be visible in both modalities. Embodiments of the present invention achieve robustness and efficiency by relying on machine learning techniques during a model estimation process in which patient-specific models of the surrogate anatomy are estimated. Embodiments of the present invention utilize a weighted mapping function learned from ground truth annotations in training data to minimize mapping error with respect to the anatomy of interest.

Figure 1:
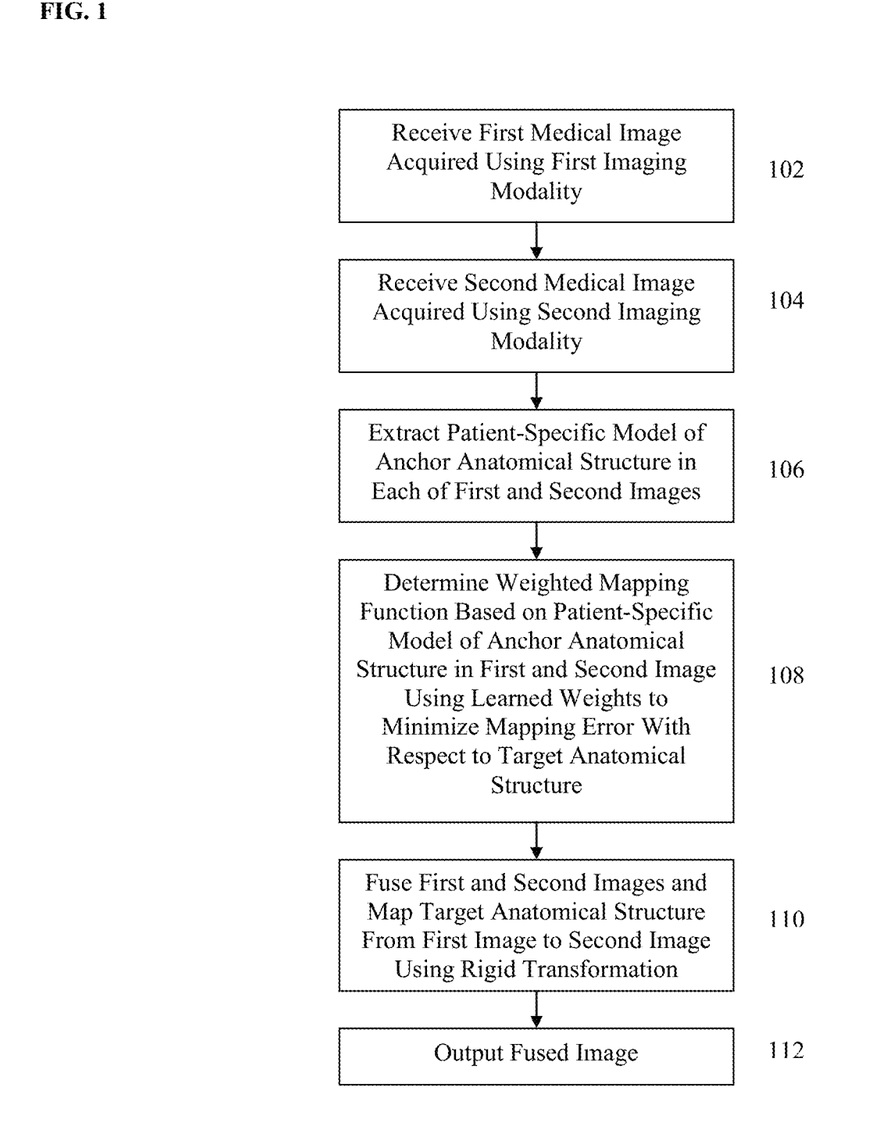
FIG. 1 illustrates a method for model-based fusion of multi-modal images according to an embodiment of the present invention.

FIG. 1 illustrates a method for model-based fusion of multi-modal images according to an embodiment of the present invention. The method of FIG. 1 can be used to map anatomy of interest from a pre-operative image acquired using a first imaging modality to an intra-operative image acquired using a second imaging modality. In an advantageous application of the present invention to transcatheter valve therapies, such as transcatheter aortic valve implantation (TAVI), a trachea bifurcation model is used as a surrogate or anchor anatomy to map the aortic valve from pre-operative 3D computed tomography (CT) to intra-operative 3D C-arm CT. Although the method of FIG. 1 is described herein by referencing the embodiment in which the trachea bifurcation model is used as the anchor anatomy to map the aortic valve from pre-operative CT to intra-operative C-arm CT, it is to be understood that the present invention is not limited thereto, and the method of FIG. 1 may be similarly applied using different anatomies and/or different imaging modalities.

Referring to FIG. 1, at step 102, a first medical image is received. The first medical image is acquired using a first imaging modality. The first medical image may be received directly from an image acquisition device, such as a CT scanner. It is also possible that the first medical image is received by loading a stored medical image from a storage or memory of a computer system. In an advantageous embodiment, the first medical image may be a pre-operative volumetric (3D) CT image of a patient.

At step 104, a second medical image is received. The second medical image is acquired using a second imaging modality. The second medical image may be received directly from an image acquisition device, such as a C-arm image acquisition device. It is also possible that the second medical image is received by loading a stored medical image from a storage or memory of a computer system. In an advantageous embodiment, the second medical image may be an intra-operative volumetric (3D) image of a patient. For example, the second medical image may be an intra-operative C-arm CT image received from a C-arm image acquisition device during an operation, such as a TAVI procedure.

At step 106, a patient-specific model of an anchor anatomical structure is extracted in each of the first and second medical images. The anchor anatomical structure is a structure that is visible in both of the first and second imaging modalities. In and advantageous implementation, the anchor anatomical structure is visible in the first and second imaging modalities without adding contrast agent. The anchor anatomical structure is used as a surrogate anatomy in order to map a target structure from on image modality, in which the target structure is visible, to the other imaging modality, in which the target structure is not visible. In order to detect the anchor anatomical structure in both imaging modalities, a patient-specific model of the anatomical structure is extracted in each of the first and second medical images. The patient-specific model of the anchor anatomical structure can be extracted in each image by estimating a mean shape model of the anchor anatomical structure learned from a set of training data in the image using machine learning techniques.

Figure 2:
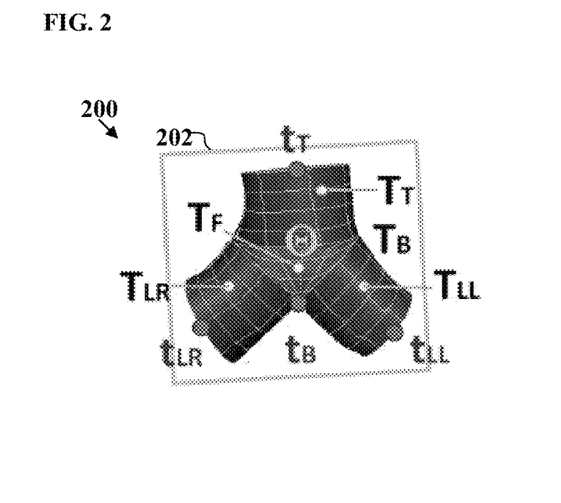
FIG. 2 illustrates a trachea bifurcation model according to an embodiment of the present invention.

In an advantageous embodiment, the anchor anatomical structure is the trachea bifurcation, and a respective patient-specific trachea bifurcation model is extracted in each of the first and second medical images. In this case, the first medical image may be a pre-operative 3D CT volume and the second medical image may be an intra-operative 3D C-arm CT volume. In an advantageous implementation, a multi-layer physiological model of the trachea bifurcation that is capable of capturing complex morphological and pathological variations is fit to the each medical in order to estimate the respective patient-specific trachea bifurcation model in each image. FIG. 2 illustrates a trachea bifurcation model 200 according to an embodiment of the present invention. The global position of the trachea bifurcation model is parameterized with a similarity transformation in three-dimensional Cartesian space:

$$\Theta = \{(c_x, c_y, c_z), (\vec{\alpha}_x, \vec{\alpha}_y, \vec{\alpha}_z), (s_x, s_y, s_z)\} \quad (1)$$

where $(c_x, c_y, c_z)$, $(\vec{\alpha}_x, \vec{\alpha}_y, \vec{\alpha}_z)$, and $(s_x, s_y, s_z)$ are the position, orientation, and scale parameters, respectively. As shown in FIG. 2, the similarity transformation defines a bounding box 202.

The next modeling layer of the trachea bifurcation model 200 includes four landmarks, which defines key anatomical properties of the trachea bifurcation model. The landmarks are the trachea airway bifurcation point $t_B$, the trachea lower-left airway branching point $t_{LL}$, the trachea lower-right airway branching point $t_{LR}$, and the trachea upper center airway point $t_T$.

The next modeling layer of the trachea bifurcation model 200 models the full geometry of the trachea bifurcation using five surface meshes constructed along rectangular grids of vertices. The underlying grid of each surface mesh spans along two physiologically aligned parametric directions $\vec{u}$ and $\vec{v}$. The surface model of the trachea bifurcation model 200 includes a trachea upper airway mesh $T_T$, a trachea lower-left airway mesh $T_{LL}$, a trachea lower-right airway mesh $T_{LR}$, a trachea bifurcation face mesh $T_F$, and a trachea bifurcation back mesh $T_B$. The trachea upper airway mesh $T_T$, the trachea lower-left airway mesh $T_{LL}$, and the trachea lower-right airway mesh $T_{LR}$ can each be represented as a tubular grid with circumferential $\vec{u}$ and ascending $\vec{v}$ directions including 36×20 vertices. The trachea bifurcation face mesh $T_F$ and the trachea bifurcation back mesh $T_B$ can be represented as paraboloids on a grid of 18×18 vertices. Every corner vertex of the face mesh $T_F$ and the back mesh $T_B$ has a corresponding vertex on the upper airway mesh $T_T$, the lower-left airway mesh $T_{LL}$ and the lower-right airway mesh $T_{LR}$.

Figure 3:
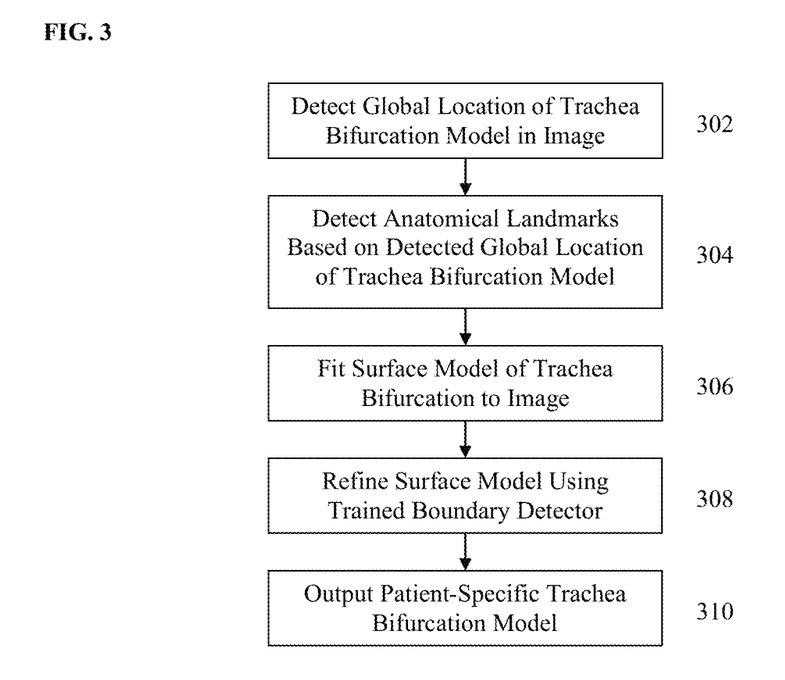
FIG. 3 illustrates a method for extracting a patient-specific trachea bifurcation model in a 3D medical image according to an embodiment of the present invention.

FIG. 3 illustrates a method for extracting a patient-specific trachea bifurcation model in a 3D medical image according to an embodiment of the present invention. The method of FIG. 3 can be applied to each of the first and second medical images in order to extract a respective patient-specific trachea bifurcation model in each image. Referring to FIG. 3, at step 302, the global location of the trachea bifurcation model is detected in the image. The global location is represented by the 3D affine parameters $(c_x, c_y, c_z, \alpha_x, \alpha_y, \alpha_z, s_x, s_y, s_z)$. These parameters define a bounding box corresponding to the global location of the trachea bifurcation model in the image, and are estimated using the Marginal Space Learning (MSL) framework. In order to efficiently localize an object using MSL, parameter estimation is performed in a series of marginal spaces with increasing dimensionality. Accordingly, the idea of MSL is not to learn a classifier directly in the full similarity transformation space, but to incrementally learn classifiers in the series of marginal spaces. As the dimensionality increases, the valid space region becomes more restricted by previous marginal space classifiers. The 3D object detection (global location estimation) is split into three steps: object position estimation, position-orientation estimation, and position-orientation-scale estimation. A separate classifier is trained based on annotated training data for each of these steps. Each classifier can be trained based on features extracted from the annotated training data using a probabilistic boosting tree (PBT). Haar features can be used to train the position classifier and steerable features can be used to train the position-orientation classifier and the position-orientation-scale classifier. This results in the estimated affine transformation (position, orientation, and scale) defining a bounding box representing the global location of the trachea bifurcation model in the image. MSL is described in greater detail in U.S. Pat. No. 7,916,919, issued Mar. 29, 2011, and entitled "System and Method for Segmenting Chambers of a Heart in a Three Dimensional Image", which is incorporated herein by reference.

At step 304, anatomic landmarks are detected in the image based on the detected global location of the aortic valve model. In particular, the trachea airway bifurcation point $t_B$, the trachea lower-left airway branching point $t_{LL}$, the trachea lower-right airway branching point $t_{LR}$, and the trachea upper center airway point $t_T$ are detected in the image using respective trained landmark detectors constrained by the detected global location (i.e., bounding box) of the trachea bifurcation model. An independent landmark detector is trained for each of the four trachea bifurcation landmarks ($t_B$, $t_{LL}$, $t_{LR}$, and $t_T$). Each landmark detector can be trained as a PBT classifier using Haar features based on annotated training data. In an advantageous embodiment, positive and negative training samples for training each landmark detector are extracted only from detected global location regions of training images.

At step 306, the surface model of the trachea bifurcation is fit to the image. The surface model includes the trachea upper airway mesh $T_T$, trachea lower-left airway mesh $T_{LL}$, trachea lower-right airway mesh $T_{LR}$, trachea bifurcation face mesh $T_F$, and trachea bifurcation back mesh $T_B$, and is estimated using a non-rigid MSL framework. In particular, a search space is defined by a number of modes of a statistical shape model of the trachea bifurcation learned from the ground truth surface meshes in the set of training data. The statistical shape model can be generated from the training data using principle component analysis (PCA) in order to represent variations in the ground truth trachea bifurcation meshes ($T_T$, $T_{LL}$, $T_{LR}$, $T_F$, and $T_B$) in the training data. In an advantageous embodiment, the search space for the trachea bifurcation surface model can be defined by the first three modes ($c_1$, $c_2$, $c_3$) of the statistical shape model computed from the training data. Each hypothesis in $c_1$, $c_2$, $c_3$ (i.e., each sample point in the statistical shape space) corresponds to a non-rigid shape. Each sample from $c_1$, $c_2$, $c_3$ is used to generate a non-rigid shape of the trachea bifurcation meshes, which is projected to the image space using the detected global localization (similarity transformation) of the trachea bifurcation model. This results in a set of hypotheses for the trachea bifurcation surface model. A trained classifier is used select the best hypothesis from the set of surface model hypotheses as the trachea bifurcation surface model (including the fiver surface meshes $T_T$, $T_{LL}$, $T_{LR}$, $T_F$, and $T_B$). This classifier can be a boosting classifier trained based on ground truth trachea bifurcation surface models in the training data and steerable features extracted around the non-rigid shape points of the surface model hypotheses. A separate classifier may be trained for each mode of the statistical shape model. Accordingly, for each surface model hypothesis projected to the detected global location of the trachea bifurcation model in the image, steerable features are extracted in a neighborhood surrounding each model point and a probability score for the hypothesis is determined by the trained classifier based on the extracted steerable features. The surface model hypothesis having the highest probability score is selected as the trachea bifurcation surface model.

At step 308, the shape of the surface model of the trachea bifurcation is refined using a trained boundary detector. The trained boundary detector can be trained based on the training data using a PBT classifier and steerable features. The boundary of the surface model is refined by applying the trained classifier locally in a neighborhood of each point on the surface model to search in a normal direction for a point having a highest probability score.

Figure 4:
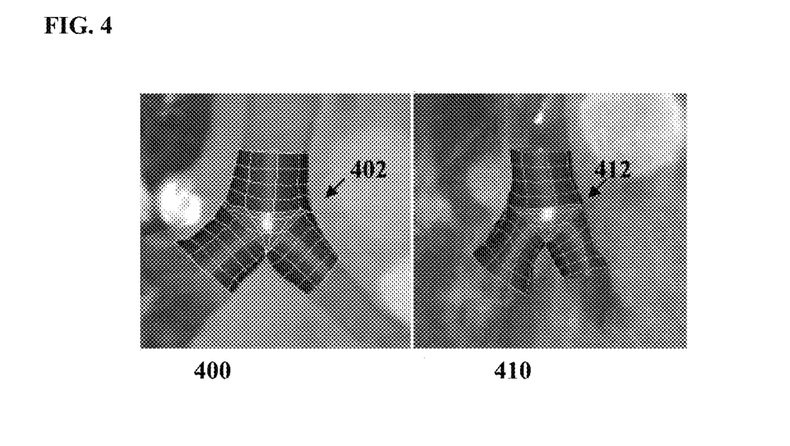
FIG. 4 illustrates an exemplary patient-specific trachea bifurcation model detection results in CT and C-arm CT images.

At step 310, the patient-specific trachea bifurcation model is output. For example, the patient-specific trachea bifurcation model can be output by displaying the patient-specific trachea bifurcation model on a display of a computer system. The patient-specific trachea bifurcation model can also be output by storing the patient-specific trachea bifurcation model on a memory or storage of a computer system. FIG. 4 illustrates an exemplary patient-specific trachea bifurcation model detection results in CT and C-arm CT images. As shown in FIG. 4, patient-specific trachea bifurcation model 402 is detected in a 3D CT image 400, and trachea bifurcation model 412 is detected in a 3D C-arm image 410.

Returning to FIG. 1, at step 108, a weighted mapping function is determined based on the patient-specific models of the anchor anatomical structure extracted in the first and second medical images using learned weights to minimize a mapping error with respect to a target anatomical structure. The weighted mapping function is a rigid transformation estimated between the patient-specific models of the anchor anatomical structure with the models of the anchor anatomical structure weighted using learned weights to minimize the mapping error with respect to the target anatomical structure. The target anatomical structure is an anatomy of interest that is visible in one of the imaging modalities but not the other. In an advantageous embodiment, the target anatomical structure is the aortic valve, the anchor structure is the trachea bifurcation model, and a rigid transformation is determined using a learned weighted mapping function to minimize a mapping error with respect to the aortic valve. The learned weighting mapping function is a set of weights applied to the mesh points of the model of the anchor anatomical structure (e.g., the trachea bifurcation model), which are learned from ground truth mappings of the target anatomical structure (e.g., the aortic valve) in a set of training data.

A rigid transformation A including a translation $A_T$ and a rotation $A_R$ can be estimated between the first medical image $I_1$ (e.g., pre-operative 3D CT image) and the second medical image $I_2$ (e.g., intra-operative 3D C-arm CT image):

$$I_1 = AI_2. \quad (2)$$

Figure 5:
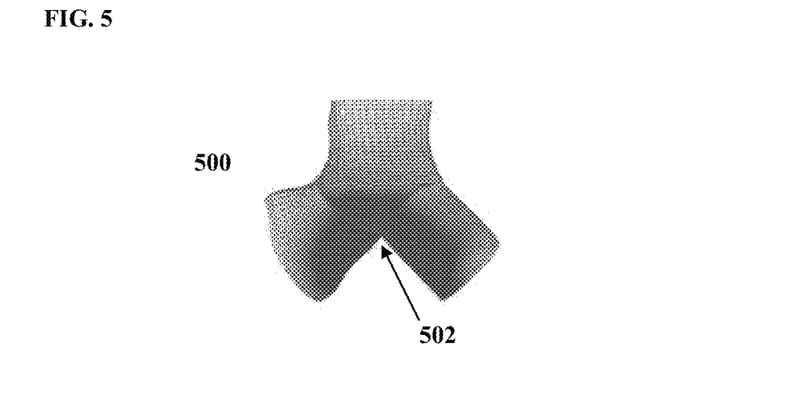
FIG. 5 illustrates a trachea bifurcation model weighted used a learned weighting function.

Based on the detected patient-specific models of the anchor anatomical structure (e.g., patient-specific trachea bifurcation models) $T_1$ and $T_2$, detected in $I_1$ and $I_2$, respectively, a least squares algorithm can be used to estimate $A_T$ and $A_R$. Typically, the least squares algorithm determines $A_T$ and $A_R$ that minimize the error between the mesh points of $T_1$ and $AT_2$. However, according to an embodiment of the present invention, in order to minimize the mapping error with respect to the target anatomical structure, a weighting factor is applied to each mesh point of the model of the anchor anatomical structure. The weighting factor weights mesh points of the model of the anchor anatomical structure based on the effect the mesh points have in accurately mapping the target anatomical structure. The weighting factor for each mesh point of the model of the target anatomical structure is provided by a learned weighted mapping function, which is learned based on ground truth mappings of models of the anchor anatomical structure with respect to the target anatomical structure in the training data. In the embodiment in which the trachea bifurcation is the anchor anatomical structure and the aortic valve is the target anatomical structure, a ground truth mapping $A_{GT}$ is estimated based on the aortic valve hinges (three points) and the aortic valve commissures (three points) in a set of training data including pre-operative images and corresponding intra-operative images. Every intra-operative trachea bifurcation model $T_2$ in the training set is transformed to the corresponding pre-operative model using: $T_{21}=A_{GT}T_2$, and the variance of the point-wise distance $|T_{21}-T_1|$ is calculated. The weighting factor w(i) for each mesh point i is calculated as:

$$w(i) = k \frac{1}{M} \sum_{j=1}^{M} |T_{21}(j, i) - T_1(j, i)| \quad (3)$$

$$i = 1 \ldots N$$

where N is the number of mesh points on the trachea bifurcation surface model, M is the number of pair-wise mesh annotations in the training set, and k is a normalizing factor. FIG. 5 illustrates a trachea bifurcation model 500 weighted used a learned weighting function. As shown in FIG. 5, each vertex of the trachea bifurcation model 500 is assigned a weight based a significance of the vertex in accurately mapping the aortic valve. Heavily weighted vertices 502 of the trachea bifurcation model appear darker in FIG. 5.

In order to determine the weighted mapping function, when the rigid transformation A is detected between the patient-specific models of the anchor anatomical structures detected in the first and second medical images, the learned weights w are applied to the mesh points of the models of the anchor anatomical structure, and the weighted mapping function is determined by solving the weighted least squares mapping:

$$e^2(R, t) = \frac{1}{N} \sum_{i=1}^{N} \|w(i)(AT_2(i) - T_1(i))\|. \quad (4)$$

The solution this problem can be determined using a well-known least squares algorithm. The weighted least squares mapping weighted using the learned weighting factors results in a rigid registration that minimizes mapping error with respect to the target anatomical structure.

Returning to FIG. 1, at step 110, the first and second medical images are fused and the target anatomical structure is mapped from the first medical image to the second medical image. In one embodiment, the entire first medical image is mapped to the second medical image using the weighted mapping function A determined in step 108. For example, a pre-operative CT image can be mapped to an intra-operative C-arm CT image. Since the target anatomical structure is visible in the first image, the target structure from the first image is mapped to the second image and is visible in the fused image. For example, when a pre-operative CT image is fused to an intra-operative 3D C-arm CT image, the aortic valve is visible in the fused image. In another embodiment, only a portion of the first medical image corresponding to the target anatomical structure is mapped to the second medical image using the determined weighted mapping function A. For example, a region corresponding to the aortic valve in a pre-operative CT image can be mapped to an intra-operative C-arm CT image using the weighted mapping function (rigid transformation) determined from the trachea bifurcation models in the CT and C-arm CT images.

In an exemplary embodiment, a patient-specific model of the target anatomical structure can be detected in the first medical image, and the patient-specific model of the target anatomical structure can be mapped to the second medical image. For example, a patient-specific model of the aortic valve can be detected in a pre-operative CT volume. A patient-specific aortic valve mode can be calculates using the method described in United States Published Patent Application No. 2012/0022843, entitled "Method and System for Comprehensive Patient-Specific Modeling of the Heart", which is incorporated herein by reference. The patient-specific model of the aortic valve can be mapped to a non-contrasted intra-operative 3D C-arm CT volume using the weighted mapping function A determined between the trachea bifurcation models detected in the pre-operative CT volume and intra-operative C-arm CT volume.

At step 112, the fused image is output. For example, the fused image, including the mapped target anatomical structure, can be output by displaying the fused image on a display device of a computer system. In the case in which, pre-operative data is mapped to intra-operative images, the fused images can be displayed in real-time as the intra-operative images are received during an intervention procedure, such as TAVI. The fused image can also be output by storing the fused image on a storage or memory of a computer system.

Figure 6:
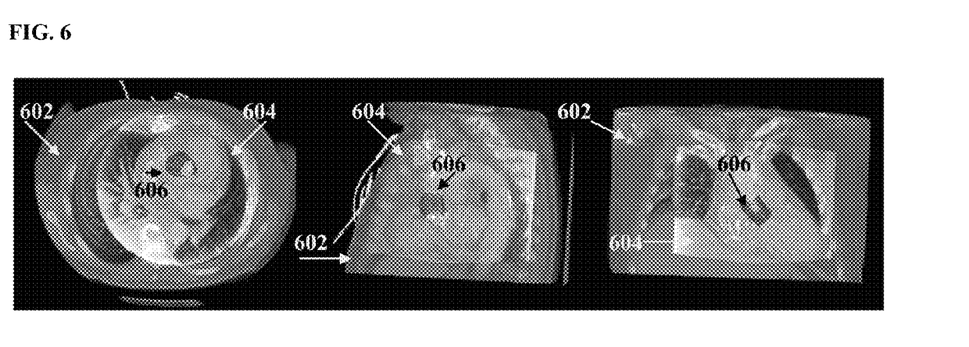
FIG. 6 illustrates exemplary image results of fusing a pre-operative 3D CT image with an intra-operative 3D C-arm CT image.

FIG. 6 illustrates exemplary image results of fusing a pre-operative 3D CT image 602 with an intra-operative 3D C-arm CT image 604. In the example of FIG. 6, the CT image 602 and the C-arm CT image 604 were fused using the trachea bifurcation model as the anchor anatomical structure and the aortic valve as the target anatomical structure. As shown in FIG. 6, a patient-specific aortic valve model 606 was detected in the CT image 602 and mapped to the C-arm CT image 604.

Figure 7:
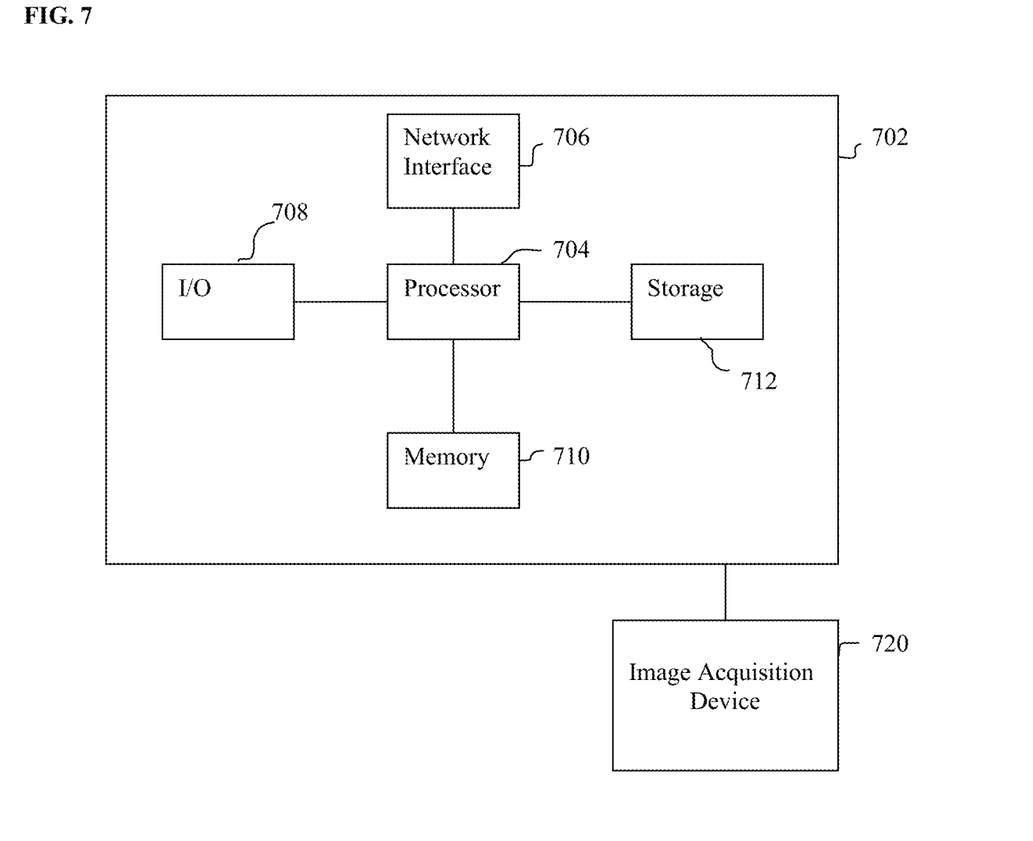
FIG. 7 is a high-level block diagram of a computer capable of implementing the present invention.

The above-described methods for model-based fusion of multi-modal images may be implemented on a computer using well-known computer processors, memory units, storage devices, computer software, and other components. A high-level block diagram of such a computer is illustrated in FIG. 7. Computer 702 contains a processor 704, which controls the overall operation of the computer 702 by executing computer program instructions which define such operation. The computer program instructions may be stored in a storage device 712 (e.g., magnetic disk) and loaded into memory 710 when execution of the computer program instructions is desired. Thus, the steps of the methods of FIGS. 1 and 3 may be defined by the computer program instructions stored in the memory 710 and/or storage 712 and controlled by the processor 704 executing the computer program instructions. An image acquisition device 720, such as a C-arm image acquisition system, CT scanner, etc., can be connected to the computer 702 to input image data to the computer 702. It is possible to implement the image acquisition device 720 and the computer 702 as one device. It is also possible that the image acquisition device 720 and the computer 702 communicate wirelessly through a network. The computer 702 also includes one or more network interfaces 706 for communicating with other devices via a network. The computer 702 also includes other input/output devices 708 that enable user interaction with the computer 702 (e.g., display, keyboard, mouse, speakers, buttons, etc.). Such input/output devices 708 may be used in conjunction with a set of computer programs as an annotation tool to annotate volumes received from the image acquisition device 720. One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for fusing a first medical image acquired using a first imaging modality and a second medical image acquired using a second imaging modality, comprising:
   detecting a first patient-specific model of an anchor anatomical structure in the first medical image and a second patient-specific model of the anchor anatomical structure in the second medical image;
   determining a weighted mapping function based on the first patient-specific model of the anchor anatomical structure and the second patient-specific model of the anchor anatomical structure using learned weights to minimize mapping error with respect to a target anatomical structure other than the anchor anatomical structure; and
   mapping the target anatomical structure from the first medical image to the second medical image using the weighted mapping function.

2. The method of claim 1, wherein detecting a first patient-specific model of an anchor anatomical structure in the first medical image and a second patient-specific model of the anchor anatomical structure in the second medical image comprises:
   detecting each of the first and second models of the anchor anatomical structure using marginal space learning.

3. The method of claim 1, wherein the anchor anatomical structure is visible the first and second imaging medical images without a contrast agent and the target anatomical structure is visible is the first medical image without a contrast agent not visible in the second medical image without a contrast agent.

4. The method of claim 1, wherein determining a weighted mapping function based on the first patient-specific model of the anchor anatomical structure and the second patient-specific model of the anchor anatomical structure using learned weights to minimize mapping error with respect to a target anatomical structure comprises:
   estimating a rigid transformation between the first patient-specific model of the anchor anatomical structure and the second patient-specific model of the anchor anatomical structure using a weighted least squares solution in which error values between transformed mesh points of the second patient-specific model of the anchor anatomy and corresponding mesh points of the first patient-specific model of the anchor anatomy are weighted using learned weights associated with the mesh points of the model of the anchor anatomical structure.

5. The method of claim 4, wherein the learned weights associated with the mesh points of the model of the anchor anatomical structure are learned based on ground truth mappings of the target anatomical structure in a set of training data.

6. The method of claim 1, wherein mapping the target anatomical structure from the first medical image to the second medical image using the weighted mapping function comprises:
   mapping the first medical image to the second medical image using the weighted mapping function.

7. The method of claim 1, wherein mapping the target anatomical structure from the first medical image to the second medical image using the weighted mapping function comprises:
   mapping a region of the first medical image corresponding to the target anatomical structure to the second medical image using the weighted mapping function.

8. The method of claim 1, wherein mapping the target anatomical structure from the first medical image to the second medical image using the weighted mapping function comprises:
   mapping a patient-specific model of the target anatomical structure detected in the first medical image to the second medical image.

9. The method of claim 1, wherein the anchor anatomical structure is a trachea bifurcation and the target anatomical structure is an aortic valve.

10. The method of claim 9, wherein detecting a first patient-specific model of an anchor anatomical structure in the first medical image and a second patient-specific model of the anchor anatomical structure in the second medical image comprises:
   for each of the first and second images, detecting a patient-specific trachea bifurcation model in each of the first and second medical images by:
      detecting a global location of the trachea bifurcation model in the image,
      detecting a plurality of trachea bifurcation landmarks in the image based on the detected global location of the trachea bifurcation model; and
      fitting a surface model of the trachea bifurcation to the image.

11. The method of claim 10, wherein detecting a plurality of trachea bifurcation landmarks in the image based on the detected global location of the trachea bifurcation model comprises:
   detecting a trachea airway bifurcation point, a trachea lower-left airway branching point, a trachea lower-right airway branching point, and a trachea upper center airway point, using trained classifiers constrained by the detected global location of the trachea bifurcation model.

12. The method of claim 10, wherein the surface model of the trachea bifurcation includes a trachea upper airway mesh, a trachea lower-left airway mesh, a trachea lower-right airway mesh, a trachea bifurcation face mesh, and a trachea bifurcation back mesh, and fitting a surface model of the trachea bifurcation to the image comprises:
   generating a plurality of trachea bifurcation surface model shapes from a learned statistical shape model;
   projecting each of the plurality of trachea bifurcation surface model shapes to an image space of image using the detected global location of the trachea bifurcation model, resulting in a plurality of surface model hypotheses; and
   selecting one of the surface model hypotheses as the surface model of the trachea bifurcation using a trained classifier.

13. The method of claim 9, wherein the learned weights are a set of weights associated with mesh points of a trachea bifurcation model that are learned based on ground truth mappings of aortic valve hinges and aortic valve commissures in a set of training data.

14. The method of claim 9, wherein mapping the target anatomical structure from the first medical image to the second medical image using the weighted mapping function comprises:
    mapping a patient-specific aortic valve model detected in the first medical image to the second medical image using the weighted mapping function.

15. The method of claim 1, wherein the first medical image is a pre-operative computed tomography (CT) image and the second medical image is an intro-operative 3D C-arm CT image.

16. An apparatus for fusing a first medical image acquired using a first imaging modality and a second medical image acquired using a second imaging modality, comprising:
    means for detecting a first patient-specific model of an anchor anatomical structure in the first medical image and a second patient-specific model of the anchor anatomical structure in the second medical image;
    means for determining a weighted mapping function based on the first patient-specific model of the anchor anatomical structure and the second patient-specific model of the anchor anatomical structure using learned weights to minimize mapping error with respect to a target anatomical structure other than the anchor anatomical structure; and
    means for mapping the target anatomical structure from the first medical image to the second medical image using the weighted mapping function.

17. The apparatus of claim 16, wherein the means for determining a weighted mapping function based on the first patient-specific model of the anchor anatomical structure and the second patient-specific model of the anchor anatomical structure using learned weights to minimize mapping error with respect to a target anatomical structure comprises:
    means for estimating a rigid transformation between the first patient-specific model of the anchor anatomical structure and the second patient-specific model of the anchor anatomical structure using a weighted least squares solution in which error values between transformed mesh points of the second patient-specific model of the anchor anatomy and corresponding mesh points of the first patient-specific model of the anchor anatomy are weighted using learned weights associated with the mesh points of the model of the anchor anatomical structure.

18. The apparatus of claim 17, wherein the learned weights associated with the mesh points of the model of the anchor anatomical structure are learned based on ground truth mappings of the target anatomical structure in a set of training data.

19. The apparatus of claim 16, wherein the anchor anatomical structure is a trachea bifurcation and the target anatomical structure is an aortic valve.

20. The apparatus of claim 19, wherein the means for detecting a first patient-specific model of an anchor anatomical structure in the first medical image and a second patient-specific model of the anchor anatomical structure in the second medical image comprises:
    means for detecting a global location of the trachea bifurcation model in an image;
    means for detecting a plurality of trachea bifurcation landmarks in the image based on the detected global location of the trachea bifurcation model; and
    means for fitting a surface model of the trachea bifurcation to the image.

21. The apparatus of claim 19, wherein the learned weights are a set of weights associated with mesh points of a trachea bifurcation model that are learned based on ground truth mappings of aortic valve hinges and aortic valve commissures in a set of training data.

22. The apparatus of claim 16, wherein the first medical image is a pre-operative computed tomography (CT) image and the second medical image is an intro-operative 3D C-arm CT image.

23. A non-transitory computer readable medium storing computer program instructions for fusing a first medical image acquired using a first imaging modality and a second medical image acquired using a second imaging modality, the computer program instructions, when executed by a processor cause the processor to perform operations comprising:
    detecting a first patient-specific model of an anchor anatomical structure in the first medical image and a second patient-specific model of the anchor anatomical structure in the second medical image;
    determining a weighted mapping function based on the first patient-specific model of the anchor anatomical structure and the second patient-specific model of the anchor anatomical structure using learned weights to minimize mapping error with respect to a target anatomical structure other than the anchor anatomical structure; and
    mapping the target anatomical structure from the first medical image to the second medical image using the weighted mapping function.

24. The non-transitory computer readable medium of claim 23, wherein determining a weighted mapping function based on the first patient-specific model of the anchor anatomical structure and the second patient-specific model of the anchor anatomical structure using learned weights to minimize mapping error with respect to a target anatomical structure comprises:
    estimating a rigid transformation between the first patient-specific model of the anchor anatomical structure and the second patient-specific model of the anchor anatomical structure using a weighted least squares solution in which error values between transformed mesh points of the second patient-specific model of the anchor anatomy and corresponding mesh points of the first patient-specific model of the anchor anatomy are weighted using learned weights associated with the mesh points of the model of the anchor anatomical structure.

25. The non-transitory computer readable medium of claim 24, wherein the learned weights associated with the mesh points of the model of the anchor anatomical structure are learned based on ground truth mappings of the target anatomical structure in a set of training data.

26. The non-transitory computer readable medium of claim 23, wherein mapping the target anatomical structure from the first medical image to the second medical image using the weighted mapping function comprises:
    mapping a patient-specific model of the target anatomical structure detected in the first medical image to the second medical image.

27. The non-transitory computer readable medium of claim 23, wherein the anchor anatomical structure is a trachea bifurcation and the target anatomical structure is an aortic valve.

28. The non-transitory computer readable medium of claim 26, wherein detecting a first patient-specific model of an anchor anatomical structure in the first medical image and a second patient-specific model of the anchor anatomical structure in the second medical image comprises:
  for each of the first and second images, detecting a patient-specific trachea bifurcation model in each of the first and second medical images by:
    detecting a global location of the trachea bifurcation model in the image,
    detecting a plurality of trachea bifurcation landmarks in the image based on the detected global location of the trachea bifurcation model; and
    fitting a surface model of the trachea bifurcation to the image.

29. The non-transitory computer readable medium of claim 26, wherein the learned weights are a set of weights associated with mesh points of a trachea bifurcation model that are learned based on ground truth mappings of aortic valve hinges and aortic valve commissures in a set of training data.

30. The non-transitory computer readable medium of claim 26, wherein mapping the target anatomical structure from the first medical image to the second medical image using the weighted mapping function comprises:
  mapping a patient-specific aortic valve model detected in the first medical image to the second medical image using the weighted mapping function.

31. The non-transitory computer readable medium of claim 23, wherein the first medical image is a pre-operative computed tomography (CT) image and the second medical image is an intro-operative 3D C-arm CT image.

* * * * *